US010005556B2

(12) United States Patent
Rastgaar Aagaah et al.

(10) Patent No.: US 10,005,556 B2
(45) Date of Patent: Jun. 26, 2018

(54) DRONE HAVING DRONE-CATCHING FEATURE

(71) Applicants: Mohammad Rastgaar Aagaah, Houghton, MI (US); Evandro M. Ficanha, Houghton, MI (US); Nina Mahmoudian, Houghton, MI (US)

(72) Inventors: Mohammad Rastgaar Aagaah, Houghton, MI (US); Evandro M. Ficanha, Houghton, MI (US); Nina Mahmoudian, Houghton, MI (US)

( * ) Notice: Subject to any disclaimer, the term of this patent is extended or adjusted under 35 U.S.C. 154(b) by 0 days. days.

(21) Appl. No.: 15/332,170

(22) Filed: Oct. 24, 2016

(65) Prior Publication Data
US 2017/0144756 A1 May 25, 2017

Related U.S. Application Data

(60) Provisional application No. 62/259,664, filed on Nov. 25, 2015.

(51) Int. Cl.
*B64C 39/02* (2006.01)
*B64D 3/00* (2006.01)
(Continued)

(52) U.S. Cl.
CPC .............. *B64C 39/024* (2013.01); *B64D 3/00* (2013.01); *F41B 11/80* (2013.01); *F41H 11/02* (2013.01);
(Continued)

(58) Field of Classification Search
CPC .......... B64C 2201/12; B64C 2201/082; B64C 2201/08; B64C 2201/182; B64C 2201/00;
(Continued)

(56) References Cited

U.S. PATENT DOCUMENTS

| 1,309,530 A | 7/1919 | Lamberson |
| 3,349,514 A | 10/1967 | Trechot |

(Continued)

FOREIGN PATENT DOCUMENTS

| CA | 2943936 A1 * | 4/2017 | ........... B64C 39/024 |
| DE | 102015003323 A1 * | 9/2016 | ............ B64C 39/02 |

(Continued)

OTHER PUBLICATIONS https://www.newscientist.com/article/dn27429-the-no-drone-zone-how-to-stop-uavs-spying-on-us-from-above/ Apr. 28, 2015, Chris Baraniuk, The no-drone zone: How to stop UAVs spying on us from above.*

(Continued)

*Primary Examiner* — Benjamin P Lee
(74) *Attorney, Agent, or Firm* — Honigman Miller Schwartz and Cohn LLP (57) ABSTRACT

A drone includes a plurality of rotors disposed at and around a base and operable to fly and steer the drone. At least one net launcher is disposed at the base and is operable to launch a net toward a target object. A control is responsive to a signal indicative of a detected target object, and the control, responsive to such a signal, is operable to aim the net launcher toward the target object and to launch the net toward the target object.

24 Claims, 6 Drawing Sheets

(51) Int. Cl.
*G05D 1/00* (2006.01)
*F41B 11/80* (2013.01)
*F41H 11/02* (2006.01)
*F41H 13/00* (2006.01)

(52) U.S. Cl.
CPC ....... *F41H 13/0006* (2013.01); *G05D 1/0094* (2013.01); *B64C 2201/108* (2013.01); *B64C 2201/12* (2013.01); *B64C 2201/121* (2013.01); *B64C 2201/126* (2013.01); *B64C 2201/141* (2013.01); *B64C 2201/146* (2013.01)

(58) Field of Classification Search
CPC ........ B64C 2201/121; B64C 2201/126; B64D 1/12; B64D 1/02; B64D 1/08
See application file for complete search history.

(56) References Cited

U.S. PATENT DOCUMENTS

| | | | |
|---|---|---|---|
| 3,803,463 | A | 4/1974 | Cover |
| 4,253,132 | A | 2/1981 | Cover |
| 4,656,945 | A | 4/1987 | Stancil |
| 4,912,869 | A | 4/1990 | Govett |
| 5,583,311 | A | 12/1996 | Rieger |
| 5,750,918 | A | 5/1998 | Mangolds |
| 6,854,374 | B1 | 2/2005 | Breazeale |
| 6,904,838 | B1 | 6/2005 | Dindl |
| 7,264,204 | B1 * | 9/2007 | Portmann ............... B63B 35/50 244/110 C |
| 7,398,617 | B2 | 7/2008 | Mattox |
| 8,123,176 | B2 | 2/2012 | Mak |
| 8,205,537 | B1 | 6/2012 | Dupont |
| 8,375,837 | B2 * | 2/2013 | Goossen ............. F41H 13/0006 244/110 F |
| 8,596,178 | B2 | 12/2013 | Rogers |
| 9,074,858 | B2 | 7/2015 | Yee |
| 9,085,362 | B1 * | 7/2015 | Kilian ...................... B64F 1/02 |
| 9,134,098 | B1 | 9/2015 | Pruett |
| 9,134,099 | B2 | 9/2015 | Tseng |
| 9,221,557 | B1 | 12/2015 | Friesel |
| 9,656,765 | B2 * | 5/2017 | von Flotow ............. B64F 1/02 |
| 2001/0032577 | A1 | 10/2001 | Swarthout |
| 2002/0134365 | A1 | 9/2002 | Gray |
| 2005/0166441 | A1 | 8/2005 | Mattox |
| 2006/0169832 | A1 | 8/2006 | Glasson |
| 2007/0169616 | A1 * | 7/2007 | Vickroy .............. F41H 13/0006 89/1.11 |
| 2007/0180983 | A1 | 8/2007 | Farinella |
| 2007/0261542 | A1 | 11/2007 | Chang |
| 2009/0084284 | A1 | 4/2009 | Martinez |
| 2009/0173250 | A1 | 7/2009 | Marscher |
| 2010/0181424 | A1 * | 7/2010 | Goossen ............. F41H 13/0006 244/110 F |
| 2010/0237183 | A1 * | 9/2010 | Wilson .................. B64C 39/024 244/3 |
| 2010/0282058 | A1 | 11/2010 | Nelson |
| 2011/0005373 | A1 | 1/2011 | Martinez |
| 2011/0220087 | A1 | 9/2011 | Gerwig |
| 2012/0011996 | A1 | 1/2012 | Glasson |
| 2012/0192707 | A1 | 8/2012 | Rogers |
| 2012/0210904 | A1 | 8/2012 | Merems |
| 2014/0000145 | A1 | 1/2014 | Merritt |
| 2014/0216290 | A1 | 8/2014 | Yee |
| 2014/0231575 | A1 | 8/2014 | Shand |
| 2014/0331984 | A1 | 11/2014 | Brahler, II |
| 2015/0168107 | A1 | 6/2015 | Tseng |
| 2015/0241180 | A1 | 8/2015 | Pruett |
| 2015/0316345 | A1 | 11/2015 | Brahler, II |
| 2015/0360797 | A1 * | 12/2015 | Melish ...................... B64F 1/02 244/110 C |
| 2016/0161225 | A1 | 6/2016 | Searle |
| 2016/0194069 | A1 † | 7/2016 | Taylor |
| 2016/0245600 | A1 | 8/2016 | Merritt |
| 2016/0251088 | A1 * | 9/2016 | Melish ...................... B64F 1/02 |
| 2016/0376029 | A1 * | 12/2016 | Sekiya .................... F41H 11/02 244/110 F |
| 2017/0036762 | A1 * | 2/2017 | Gamble ................. B64C 27/08 |
| 2017/0158340 | A1 * | 6/2017 | von Flotow .......... B64D 27/24 |
| 2017/0225784 | A1 | 8/2017 | Hayes et al. |
| 2017/0356726 | A1 | 12/2017 | Theiss et al. |

FOREIGN PATENT DOCUMENTS

| | | | | |
|---|---|---|---|---|
| EP | 3127809 | A1 * | 2/2017 | ............. B64C 27/08 |
| WO | WO 2014080387 | A2 * | 5/2014 | ........... B64C 39/024 |

OTHER PUBLICATIONS https://overlanduas.wordpress.com/2015/02/12/drone-catcher/ Unmanned Aerial Systems—A Beginners Guide, Drone Catcher! Feb. 12, 2015.*
Drone Catcher, "Robotic Falcon" can Capture, Retrieve Renegade Drones, Michigan Tech News, Jan. 7, 2016.
"Drone squad to be launched by Tokyo police", www.BBC.com, Dec. 11, 2015.

* cited by examiner
† cited by third party

DRONE HAVING DRONE-CATCHING FEATURE

CROSS REFERENCE TO RELATED APPLICATION

The present application claims the filing benefits of U.S. provisional application Ser. No. 62/259,664, filed Nov. 25, 2015, which is hereby incorporated herein by reference in its entirety.

FIELD OF THE INVENTION

The present invention relates generally to drones, such as multi-rotor drones and the like.

BACKGROUND OF THE INVENTION

Drones are known and can be remotely controlled by a user to fly the drone at remote areas. Drones typically have a plurality of rotors that are remotely controlled by the user to control elevation and flying direction of the drone. It is known to attach a camera to a drone to assist the user in seeing where the drone is flying.

SUMMARY OF THE INVENTION

The present invention provides a drone-catcher (hunter drone) equipped with a net-launcher for capturing intruding drones (or other targeted objects). The net-launcher launches a net to capture and carry away intruding drones (or other targeted objects). The net launcher is attached to a gimbal or pivoting support allowing the aiming of the net launcher independently of the hunter drone movement. A cable connects the net to the frame of the hunter drone or to the gimbal, such that, after capturing the intruding drone with a launched net, the hunter can carry or tow the captured drone away and may drop or release the captured drone at a selected location.

The present invention thus provides a hunter drone for removing possible hazardous material or explosives that the hunter drone may carry away from the protected areas. The hunter drone can be equipped with different onboard sensors to detect and capture the intruding drone. In addition, remotely located sensing systems may relay information regarding the position and trajectory of the intruding drone to the hunter drone to minimize the amount of hardware required on the hunter drone and allow integration of the drone-catcher system into a larger defensive system. The hunter can operate autonomously or semi-autonomously with a remote human operator.

The hunter drone of the present invention enables capturing of intruding drones and moving or towing the captured drones (or other objects) into safe or protected areas. Examples of applications where the hunter drone may find use include crowded areas where such intruding drones can be used as a means to carry explosives or other harmful material, or high security areas where intruding drones can be used for surveillance, such as at military bases, government buildings, or large factory plants. Other variations of the hunter drones of the present invention may include using hunter drones for capturing birds or small animals, such as for research or the like, or using hunter drones for recreational purposes.

These and other objects, advantages, purposes and features of the present invention will become more apparent upon review of the following specification in conjunction with the drawings.

DETAILED DESCRIPTION OF THE INVENTION

Figure 1:
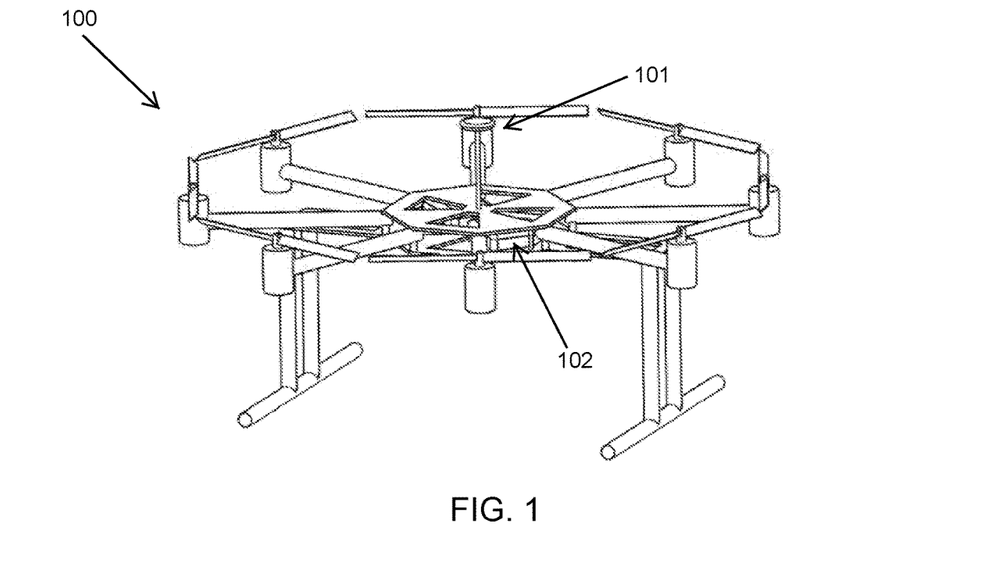
FIG. 1 is a perspective view schematic of a hunter drone suitable for use with the present invention.

The schematics of the preliminary design of a prototype hunter drone and its major components in two different configurations are shown in FIGS. 1-5. The hunter drone 100 comprises a standard octocopter (having a plurality of rotors that are controlled to fly and steer the drone in a known manner) with GPS 101, radio, inertial measurement unit (IMU), and a flight controller (FIG. 1). The drone has intruding detecting electronics (that operate to detect an intruding drone or device and/or to receive a signal indicative of a detected intruding drone or device that may be detected by a remote sensor or device or system) that may include (but is not limited to) wireless communication to ground sensors (or other remote device or system), onboard cameras, radar sensors, laser scanners, infrared scanners, and sonar scanners 102. The drone of the present invention includes one or more (preferably multiple) net launchers that may be readily aimed at a target or intruding drone and launched to capture the intruding drone, as discussed below.

Figure 2:
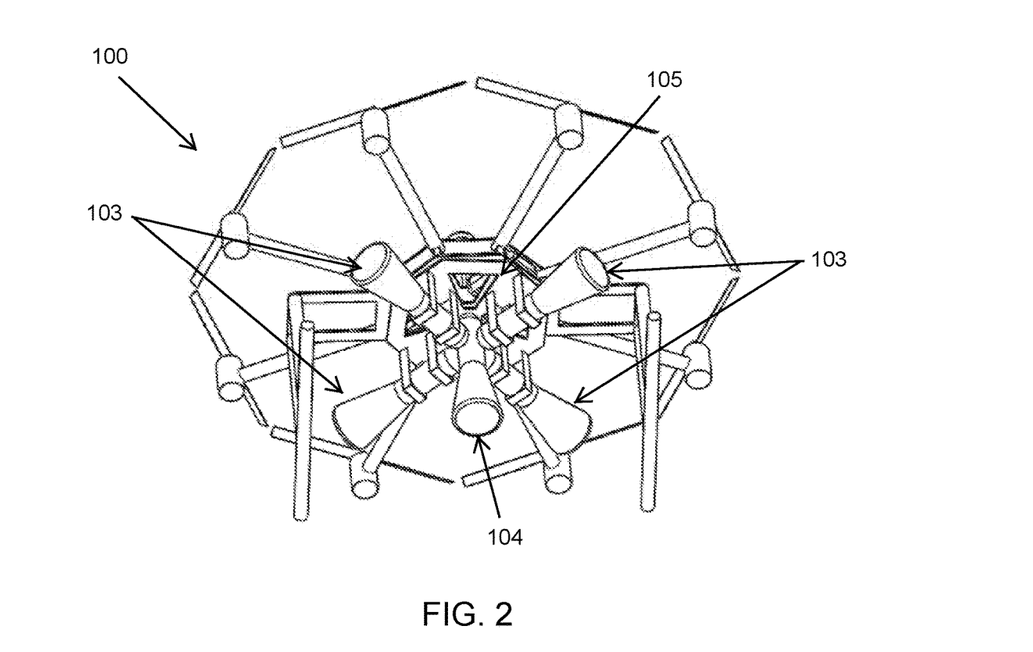
FIG. 2 is a perspective view schematic of a hunter drone in accordance with the present invention, shown with four horizontal net launchers and one vertical net launcher.

In the illustrated embodiment of FIG. 2, the drone 100 includes five net launchers 103, 104. The drone has four generally horizontally oriented net launchers 103 oriented about 90 degrees apart from each other and one net launcher 104 pointing generally vertically downwards. The net launchers are mounted to a rotating platform 105 capable of yaw motion (pivoting or rotating about a generally vertical axis or axis generally normal to a plane of the rotors of the drone), allowing the four horizontal launchers 103 to rotate so the drone can quickly point a net launcher at any point in the generally horizontal plane with no more than about 45 degrees of rotation of the platform 105. By rotating the drone itself about any of its horizontal axes, either a horizontal net launcher or the vertical net launcher (whichever one is closer) can aim at any point in the space below the net launcher with no more than about 45 degrees of rotation or tilt of the drone plus at most about 45 degrees of rotation of the rotating platform 105. This way, there is always a net launcher no more than 45 degrees away from the intruding drone in both the vertical and horizontal planes, so long as the intruding drone is at the same height as or below the hunter drone (or above the drone but within about a 45 degree angle relative to the plane of the drone 100). Optionally, each of the net launchers may be at a different angle relative to horizontal so that the drone can rotate to aim a selected one of the net launchers (that is at an appropriate downward angle to aim at the target) at the target.

Figure 4:
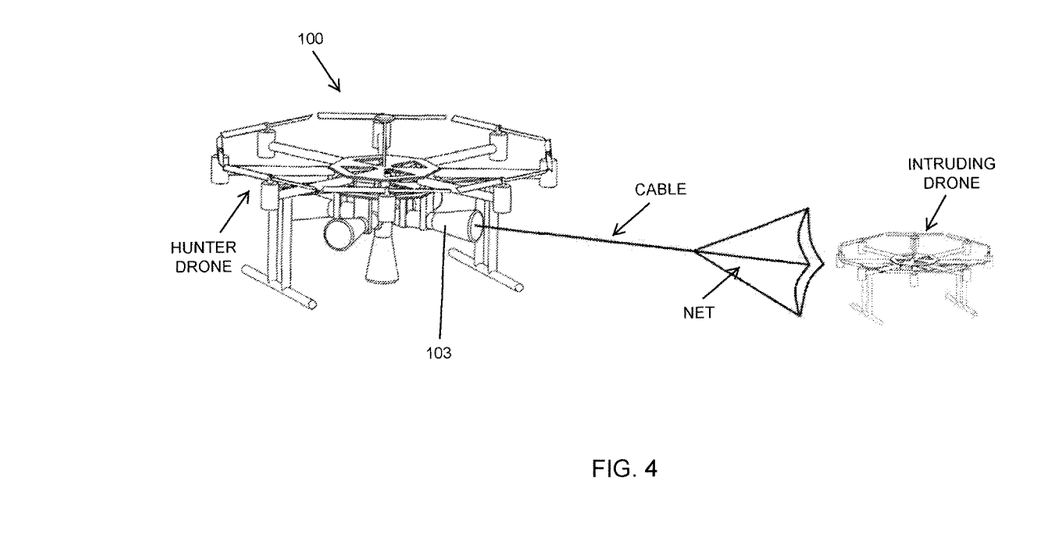
FIG. 4 is another perspective view schematic of the hunter drone of FIG. 2 capturing an intruding drone in accordance with the present invention.

The net launchers 103, 104 function to launch a net or web-like element (such as via any launching means, such as pressurized air or gas or any other suitable means for launching the net from the launcher) towards a targeted object or intruding drone to capture or net the targeted object (see FIG. 4). The net launchers are operated via remote control (preferably the same remote control that controls the drone rotors and rotation of the platform and net launchers) but could be automatically operated when an individual net launcher is aimed at the target (such as responsive to image processing of image data captured by a camera at the drone). Optionally, and desirably, the net may be attached to the net launcher via a string or thin cable or the like, such that, when the net is launched and captures the targeted object, the drone 100 may drag or tow the captured object or intruding drone to a remote location via the string or cable. Optionally, the string or cable may be detached (such as cut or otherwise released) from the net launcher to release the net and captured object or drone at a targeted or safe area (or to release a launched net if the launched net misses its target and is hanging from the drone 100 by the cable).

Optionally, other configurations of net launchers may be implemented at the drone while remaining within the spirit and scope of the present invention. For example, and such as shown in FIG. 3, another hunter drone 100' may have a configuration that includes four net launchers 103 mounted to a rotating platform 105 (yaw motion), allowing the four net launchers to rotate so the drone can quickly point a net launcher at any point in the horizontal plane with at most about 90 degrees of rotation of the platform 105.

Figure 3:
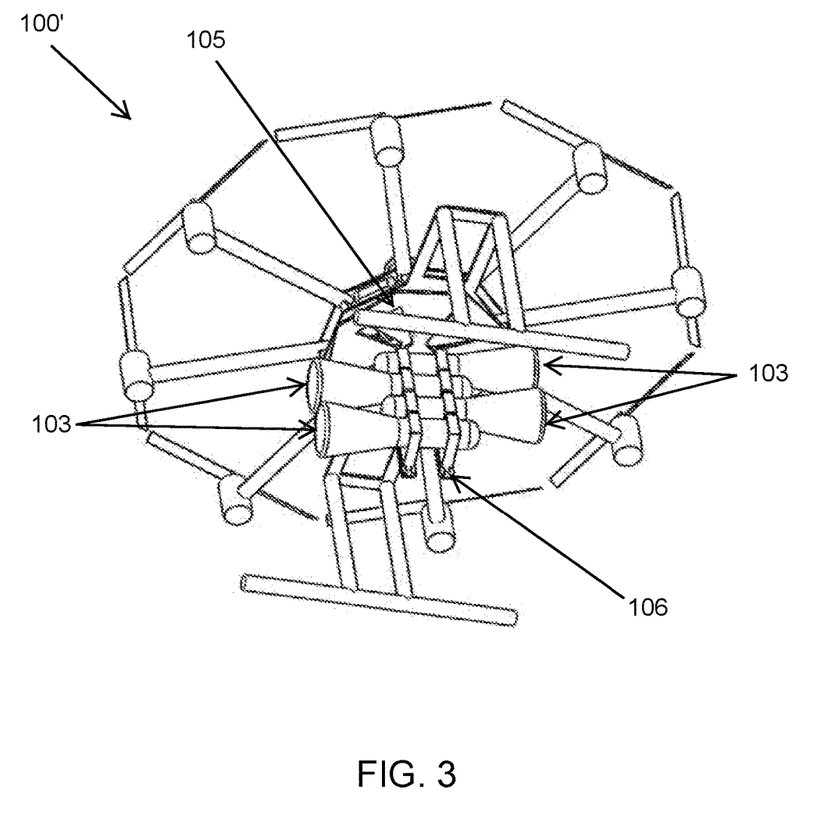
FIG. 3 is a perspective view schematic of another hunter drone of the present invention, shown with four horizontal net launchers mounted to a rail.

In the illustrated embodiment of FIG. 3, the net launchers 103 are mounted to a support or rail 106 that extends downward from the rotating platform 105, with the net launchers disposed vertically along the rail. Optionally, the net launchers are detachably mounted at the rail 106, which allows the lowest net launcher to be detached or released from the rail and for the other net launchers to slide or move along the rail and vertical axis of the drone (the detaching may comprise any suitable means, such as a latch that opens a channel along which the drone slides, such that, when the channel is opened, the drone slides downward out of the channel and is released). This way the lowest net launcher can be used to capture or net a first intruding drone and then may be released from the drone (while the net launcher is still attached to the net and intruding drone via the cable), whereby another one of the net launchers (such as the next lowest net launcher) can slide down to the next lower location and can then be used to capture another intruding drone. Such a configuration allows the drone to launch multiple nets to catch multiple intruding drones and/or decrease its weight to increase flight time and/or speed. This can be done in consecutive order to drop as many net launchers as the drone is carrying, which is not limited to four net launchers.

With reference to FIG. 4, the hunter drone 100 (of FIG. 2) is shown capturing an intruding drone. When the net launcher 103 launches its net, the launched net will carry a string or thin cable to keep the net connected to the hunter drone, allowing the captured intruding drone to be carried by the hunter drone to a safe area. In configurations where the net launcher or launchers is/are detachably mounted at the drone, the hunter drone can release the net launcher that has captured the intruding drone so as to drop the intruding drone at a safe area, and then the subject drone may continue to pursue and capture more intruding drones if required.

Figure 5:
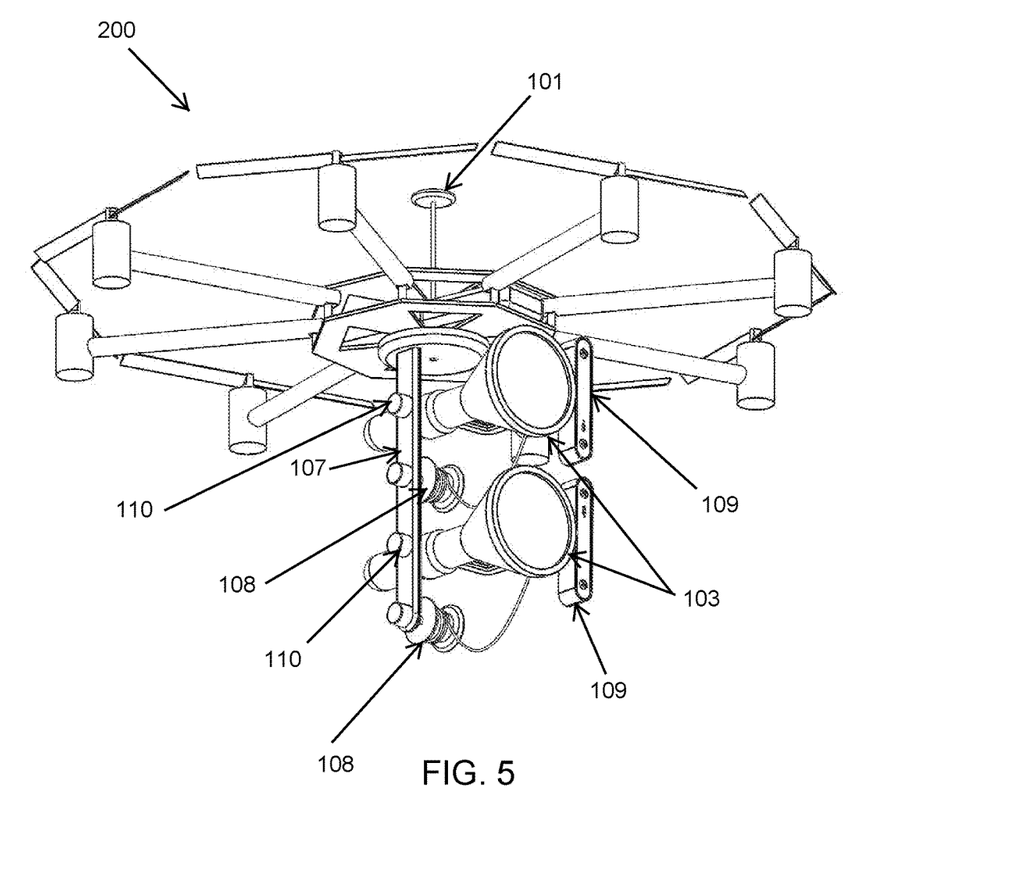
FIG. 5 is a perspective view of another hunter drone of the present invention, shown with two horizontal net launchers mounted to a gimbal equipped with detection sensors, where the net launchers' pitch motions are controlled with different electric motors.

Optionally, a hunter drone configuration may include two net launchers 103, such as shown in FIG. 5. The net launchers are pivotally mounted to a vertical support or gimbal 107, such that the hunter drone and net launchers provide two degrees of freedom and with yaw and pitch motions. This configuration allows the two net launchers to pivot or rotate in yaw and pitch motions. For example, and as can be seen with reference to FIG. 5, the gimbal 107 can rotate relative to the base of the hunter drone 200 about a generally vertical axis, while the net launchers 103 can also rotate about generally horizontal axes via their pivot mounts 110 at the gimbal or vertical support 107. This way the hunter drone can quickly point the net launcher to any direction without the need to reposition itself or change its attitude. Moreover, this configuration is equipped with powered reels 108 and cables (one for each net launcher) connected to a net of respective net launcher, allowing the hunter drone to captured a prey drone (or other object) and bring it closer to the hunter drone so as to limit or prevent the caught drone from impacting the ground (or other structure).

In addition, stereo cameras 109 and/or a variety of other sensors may be mounted to the gimbal 107 for this configuration. The stereo cameras move when the gimbal moves so they are aimed generally in the direction that the respective net launcher is aimed (and may either pivot up and down with the respective net launcher or may have a wide angle field of view that encompasses the targeting range of the net launcher or launchers). Data captured by the stereo cameras (and/or other sensors) is processed to allow the hunter drone to measure the distance to the target drone, and to allow for proper aiming of the net launcher since the stereo cameras move with the net launchers. Optionally, the controls of the net launchers and rotating platform may be responsive to processing of captured data so that the drone may automatically aim the net launcher at the target and launch a net at the target.

Figure 6:
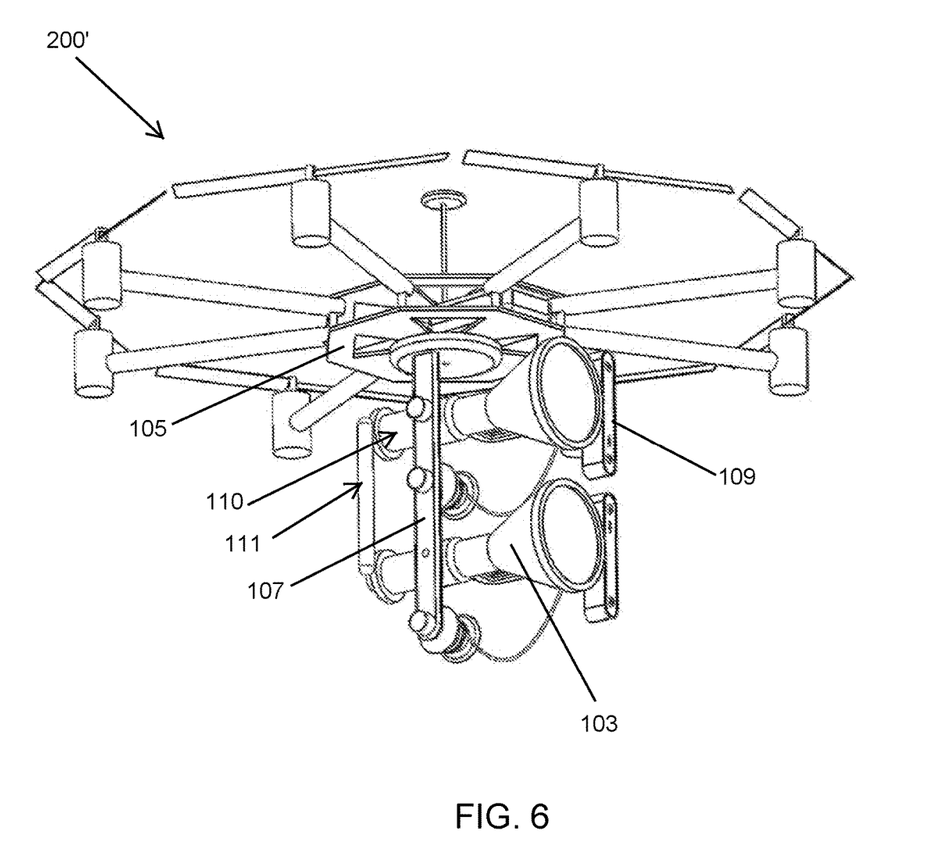
FIG. 6 is a perspective view of another hunter drone of the present invention, shown with two horizontal net launchers mounted to a gimbal equipped with detection sensors, where both net launchers' pitch motions are controlled with one electric motor.
Figure 7:
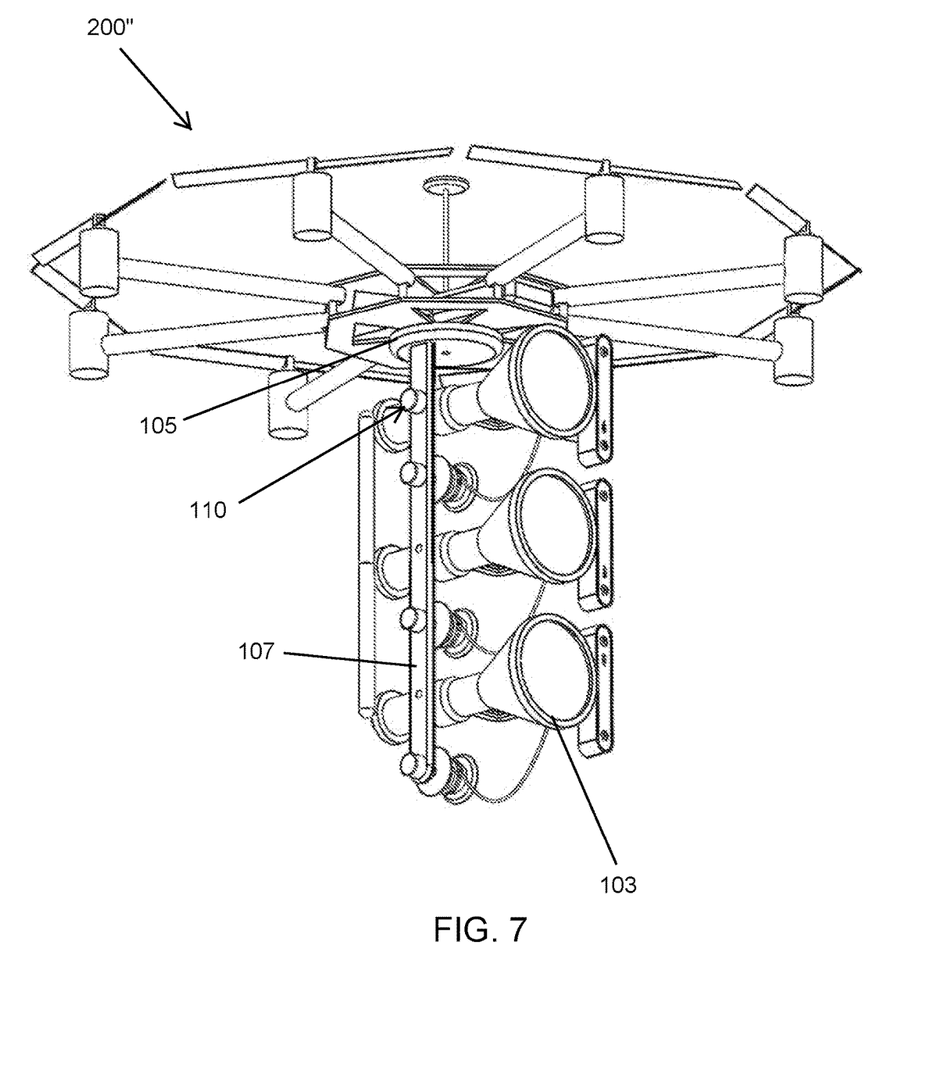
FIG. 7 is a perspective view of another hunter drone of the present invention, shown with three horizontal net launchers mounted to a gimbal equipped with detection sensors, where all of the net launchers' pitch motions are controlled with one electric motor.

Optionally, the net launchers may be pivoted and aimed together, such as via a single motor that pivots or rotates the net launchers relative to the gimbal or support in tandem. For example, and such as shown in FIG. 6, a hunter drone 200' of the present invention, shown with two horizontal net launchers 103 mounted to a gimbal 107 equipped with detection sensors 109, where both net launchers' pitch motions are controlled with a single or common electric motor 111 (such as a linear actuator mounted at the rotating platform 105 that engages a portion of each net launcher to impart pivotal movement of the net launchers in tandem about their respective pivot mounts at the gimbal 107). Optionally, and such as shown in FIG. 7, a hunter drone 200" may be similar to hunter drone 200', but may include three (or more) net launchers pivotally mounted at a gimbal 107 and rotating platform 105, such as in a similar manner as discussed above. Hunter drones 200', 200" may otherwise be similar in construction and operation as the hunter drones discussed above, such that a detailed discussion of the drones need not be repeated herein.

Therefore, the present application provides a hunter drone that is operable to track and capture intruding drones (or other flying objects) via one or more net launchers mounted at the hunter drone. During operation, the hunter drone may be flown (via known operation of the rotors of the drone and optionally responsive to a remote control or GPS sensor at the drone or other suitable flying control means) and positioned to track and capture a flying object. The sensors of the hunter drone (such as one or more cameras and/or other scanning/sensing devices) capture data in their fields of view/sensing and the data is processed to determine the location of the target object. The hunter drone (or a person operating the hunter drone via a remote control) aims one of the net launchers (such as a lowermost net launcher for embodiments where a plurality of net launchers are arranged vertically at a gimbal or support of the drone) and, when the net launcher is properly aimed, launches a net towards the target to capture the target with the net. The target, when captured by the net, likely will not be able to continue flying and may drop to the ground. Optionally, the hunter drone includes a cable attached to the launched net, and the hunter drone may, once the target is caught by the launched net, drag the captured target to a desired or selected location. Optionally, the hunter drone may drag the captured target object to a target or selected location and may disconnect its net launcher (that has launched the net and that is connected to the target via the net and cable) and/or cable winding device, so that the cable winding device or net launcher (which may be weighted to further limit the ability of the captured target to continue flying) may drop to the ground at a target location, dragging the captured target object with them.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A drone, comprising:
    a plurality of rotors disposed at and around a base and operable to fly and steer the drone;
    at least one net launcher disposed at the base, wherein the net launcher is operable to launch a net toward a target object;
    a control, wherein the control, responsive to a signal indicative of a detected target object, is operable to aim the net launcher toward the target object and to launch the net toward the target object; and
    wherein the net launcher is disposed at a rotating platform of the base, and wherein the control is operable to rotate the rotating platform relative to the base to aim the net launcher toward the target object.

2. The drone of claim 1, wherein, when the rotating platform is horizontal, the platform rotates about a vertical axis of rotation.

3. The drone of claim 2, wherein the net launcher is disposed on a support element that suspends from the rotating platform, and wherein the net launcher is pivotally mounted at the support element so as to pivot about a horizontal axis when the platform is horizontal.

4. The drone of claim 1, wherein the drone comprises a plurality of net launchers disposed at the rotating platform.

5. The drone of claim 4, wherein at least two of the net launchers are arranged horizontally at the rotating platform and wherein at least one of the net launchers is arranged vertically at the rotating platform.

6. The drone of claim 4, wherein the net launchers are disposed at a vertical rail.

7. The drone of claim 6, wherein the net launchers are detachably attached at the rail.

8. The drone of claim 1, wherein the net launcher is detachably attached at the base.

9. The drone of claim 1, wherein the net launcher includes a line that connects the launched net to the net launcher or the drone after the net is launched.

10. The drone of claim 9, wherein the drone is operable to tow the captured object via the line and net after the net is launched and captures the object.

11. The drone of claim 1, wherein the signal comprises at least one of (i) a signal communicated wirelessly to the drone from a remote device, (ii) a signal generated by a sensor of the drone and (iii) a signal from a remote controller that controls operation of the drone.

12. The drone of claim 1, wherein the control is one of (i) an autonomous control and (ii) a user controlled control.

13. The drone of claim 1, wherein the targeted object comprises an intruding drone.

14. The drone of claim 1, wherein the drone comprises a plurality of net launchers and wherein the net launchers are arranged such that one of the net launchers is within 45 degrees of movement to aim the net launcher at a targeted object that is level with or below the drone.

15. A drone comprising:
    a plurality of rotors disposed at and around a base and operable to fly and steer the drone;
    a plurality of net launchers disposed at a support element that extends downward from the base, wherein each of the net launchers is operable to launch a net toward a target object;
    wherein the support element is rotatable about a vertical axis when the drone is horizontal;
    wherein the net launchers are pivotally mounted at the support element via a respective gimbal so that the net launchers pivot relative to the support element independent of movement of the drone; and
    a control, wherein the control, responsive to a signal indicative of a detected target object, is operable to pivot and aim one of the net launchers toward the target object and to launch the net of the aimed net launcher toward the target object, and wherein the control is one of (i) an autonomous control and (ii) a user controlled control.

16. The drone of claim 15, wherein the net launchers are detachably attached at the support element, and wherein a lowermost net launcher at the support element is detached from the support element before the others of the net launchers.

17. The drone of claim 15, comprising a cable that connects the launched net to the net launcher or the drone after the net is launched.

18. The drone of claim 17, wherein the drone is operable to tow the captured object via the cable and net after the net is launched and captures the object.

19. The drone of claim 15, wherein the signal comprises at least one of (i) a signal communicated wirelessly to the drone from a remote device, (ii) a signal generated by a sensor of the drone and (iii) a signal from a remote controller that controls operation of the drone.

20. The drone of claim 15, wherein the plurality of net launchers comprises at least three net launchers pivotally attached along the support element.

21. A drone comprising:
a plurality of rotors disposed at and around a base and operable to fly and steer the drone;
a net launcher disposed at a support element that extends downward from the base, wherein the net launcher is operable to launch a net toward a target object;
wherein the net launcher is pivotally mounted via a gimbal at the support element so as to pivot relative to the base of the drone;
a control, wherein the control, responsive to a signal indicative of a detected target object, is operable to aim the net launcher toward the target object and to launch the net of the aimed net launcher toward the target object, and wherein the control is one of (i) an autonomous control and (ii) a user controlled control; and
wherein the control aims the net launcher at least in part by pivoting the net launcher relative to the support element.

22. The drone of claim 21, comprising a cable that connects the launched net to the net launcher or the drone after the net is launched.

23. The drone of claim 21, wherein the signal comprises at least one of (i) a signal communicated wirelessly to the drone from a remote device, (ii) a signal generated by a sensor of the drone and (iii) a signal from a remote controller that controls operation of the drone.

24. The drone of claim 1, wherein the net launcher is attached to a gimbal of the rotating base, and wherein the gimbal allows for aiming of the net launcher independently of movement of the drone.

* * * * *

UNITED STATES PATENT AND TRADEMARK OFFICE
CERTIFICATE OF CORRECTION

PATENT NO. : 10,005,556 B2
APPLICATION NO. : 15/332170
DATED : June 26, 2018
INVENTOR(S) : Mo Rastgaar et al.

Page 1 of 1

It is certified that error appears in the above-identified patent and that said Letters Patent is hereby corrected as shown below:

On the Title Page

In both the Item (71) Applicants and Item (72) Inventors sections "Mohammad Rastgaar Aagaah" should be "Mo Rastgaar"

Signed and Sealed this
Second Day of October, 2018

Andrei Iancu
*Director of the United States Patent and Trademark Office*